Feb. 26, 1963    G. E. HANDWERK    3,079,238
GAS PURIFICATION SYSTEM
Filed Feb. 27, 1961
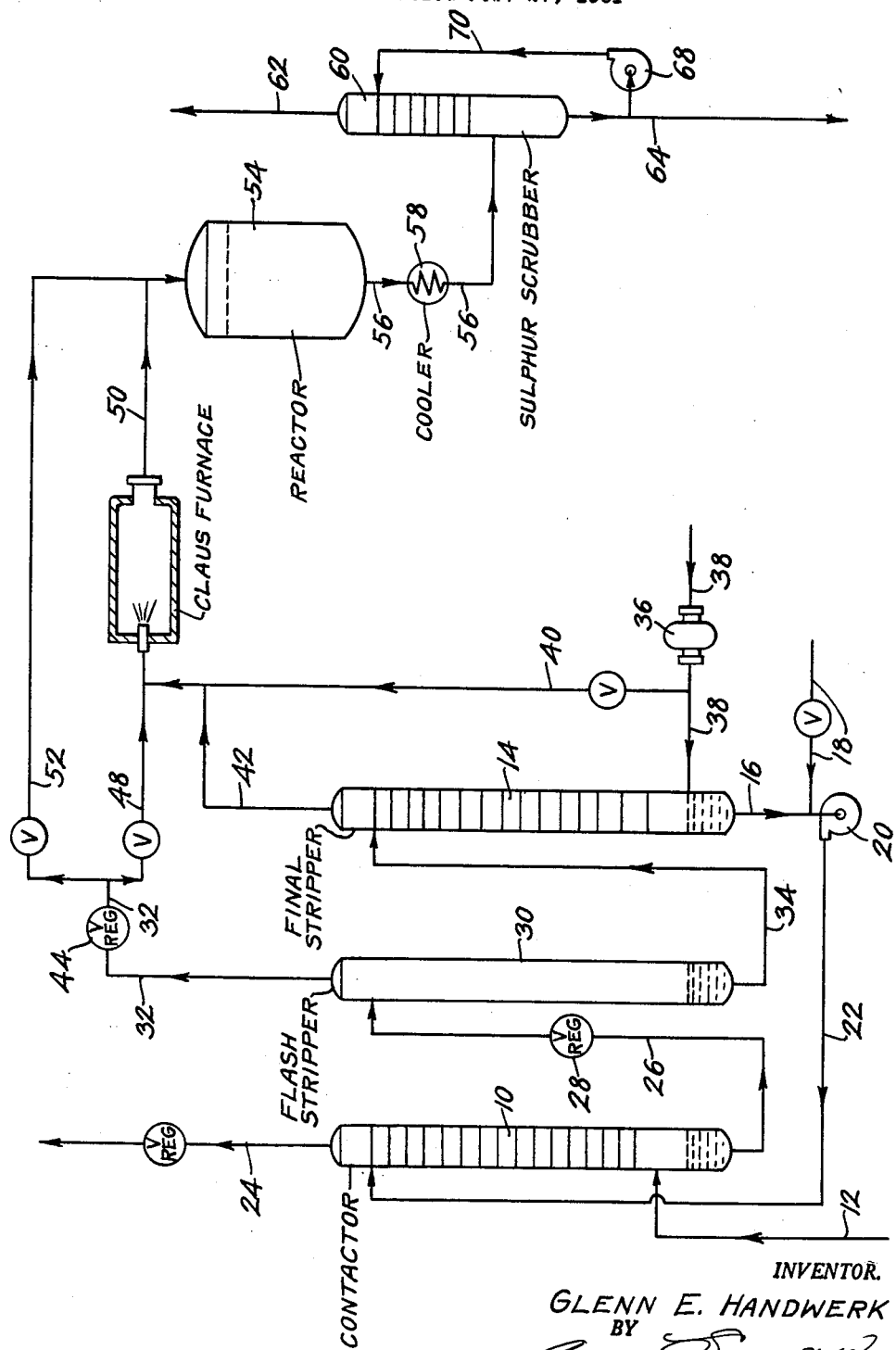
INVENTOR.
GLENN E. HANDWERK
BY
ATTORNEYS

United States Patent Office 3,079,238
Patented Feb. 26, 1963

1

3,079,238
GAS PURIFICATION SYSTEM
Glenn E. Handwerk, Denver, Colo., assignor to Stearns-Roger Manufacturing Company, Denver, Colo., a corporation of Colorado
Filed Feb. 27, 1961, Ser. No. 91,678
8 Claims. (Cl. 23—226)

This invention relates to a gas purification system and, more specifically, to a process for the removal of hydrogen sulfide gas from raw natural gas and subsequently recovering the sulfur values therefrom.

Raw natural gas from the field oftentimes contains substantial amounts of hydrogen sulfide gas as a contaminant which is preferably removed prior to use. In the prior art gas purification systems for this purpose the sour gas is customarily washed with a solvent in an ordinary contactor at an elevated pressure in order to absorb the hydrogen sulfide component of the gaseous mixture. The hydrogen sulfide thus removed is then desorbed from the solvent by flashing the latter into a relatively low pressure zone where the hydrogen sulfide separates from the solvent in a gaseous phase. The desorption of the dissolved hydrogen sulfide gas, however may not be complete at this stage and the solvent frequently must be subjected to further treatment such as stripping it with an ascending stream of pressurized air.

In accordance with prior art practices, this sour air stream is vented to the atmosphere creating an odor problem. Of even greater significance, however, is the fact that this air stream carries with it a significant amount of the total hydrogen sulfide removed by the process which is thus lost to the atmosphere. The balance of the hydrogen sulfide stripped from the sour natural gas is usually reclaimed by burning a portion thereof with air to produce sulfur dioxide. This product is then reacted with the balance of the hydrogen sulfide extracted from the natural gas in a manner to provide elemental sulfur and water vapor.

If water is employed as the principal solvent, the natural gas stream issuing from the contactor may still contain quantities of hydrogen sulfide and, if desired, this can be removed by sending the partially sweetened gas through an amine-type treating unit to accomplish substantially complete removal of the contaminant. As is often the case, however, the minute quantities of dissolved hydrogen sulfide gas remaining after the amine treating operation are insignificant and the sweet natural gas can then be fed directly into the supply line.

It has now been found in accordance with the teaching of the instant invention that the air stream customarily employed as means for regenerating the wash water can be employed to advantage as a source of combustion air in the sulfur recovery operation. Several significant improvements in the prior art natural gas purification systems are thus realized. First of all, the entire quantity of hydrogen sulfide gas removed from the natural gas in the purification operation is ultimately recovered as elemental sulfur from the effluent air stream in the sulfur recovery operation rather than being wasted through discharge to the atmosphere. Also, by eliminating the step of venting the effluent air stream to the atmosphere, the nuisance of polluting the countryside with sulfur fumes is done away with.

2

It is, therefore, the principal object of the present invention to provide a novel and improved system for the removal of hydrogen sulfide gas from a sour natural gas stream.

A second objective is to provide a process of the type aforementioned in which all but trace amounts of the hydrogen sulfide removed from the sour natural gas stream is ultimately reclaimed as elemental sulfur.

Another object of the invention is the provision of a gas purification process in which the air employed to desorb the remaining absorbed hydrogen sulfide contaminant from the wash water or similar type of solvent after the latter has been flashed is used as a source of combustion air in a subsequent sulfur recovery operation.

An additional object is the elimination of the air pollution problem customarily associated with the prior art natural gas sweetening processes that vent the regenerative air stream containing objectionable amounts of hydrogen sulfide into the atmosphere.

Further objectives of the invention that forms the subject matter of the instant application are to provide a natural gas purification process that is economical, safe, efficient, practical and requires a negligible amount of additional process equipment.

Other objects will be in part apparent and in part pointed out specifically hereinafter in connection with the detailed description that follows of the gas purification system which has been illustrated diagrammatically in the accompanying single sheet of drawings.

Natural gas containing hydrogen sulfide as a contaminant enters the lower end of the contactor 10 by means of supply line 12 at a pressure of about 200 p.s.i. or higher and a temperature of approximately 100° F. The regenerated wash water following desorpotion of the dissolved hydrogen sulfide therefrom in the air-blown final stage stripper 14 is drawn off the bottom of the latter in line 16 and combined with a quantity of make-up water entering through line 18; whereupon, these combined streams are fed to pump 20 and delivered into the upper end of the contactor 10 at a pressure of approximately 470 p.s.i. and a temperature of 145° F. by means of line 22.

The contactor or absorber 10 is of the multiply-tray type in the particular form shown herein and functions to decontaminate the sour gas by removing the major portion of dissolved hydrogen sulfide gas therefrom at an elevated pressure. The sour gas entering the absorber may contain other contaminants such as, for example, carbon dioxide, carbon disulfide, and carbonyl sulfide in addition to hydrogen sulfide, all or substantial portions of which will be absorbed by the water in the absorption tower leaving the natural gas stream relatively sweet as it leaves the top of the tower through line 24. Any of the residual sulfurous contaminants can be removed at this point by treating the partially sweetened gas stream with an amine, hot potassium or any of the other commonly employed solvents.

The water rich in the absorbed contaminants from the sour gas is drawn off the bottom of the absorption tower 10 through line 26 where it passed through regulator 28 to effect a substantial reduction in the pressure thereof down to about 10 p.s.i. or less preparatory to being delivered into the upper end of flash stripping tower 30. Stripper 30 effects a substantial desorption of the dissolved sulfur bearing contaminants which leave the top of the desorption tower in the gaseous phase through line 32. The wash water which remains in the liquid phase at a temperature of about 120° F. in the desorption tower traverses downwardly where it is withdrawn through line 34 at the bottom still containing about two percent of the sulfur-containing contaminants originally present in the sour natural gas stream. At this point the wash water is delivered to the upper end of the final stage stripper 14 preparatory to being blown with air at a temperature of about 80° F. entering the lower end of the aforementioned tower. The stripping air used to regenerate the wash water passes through a blower 36 which delivers it to the air-stripper in line 38 at a pressure of approximately 15 p.s.i. A portion of this stripping air maybe drawn off ahead of the tower but downstream of the pump through by-pass line 40 where it is subsequently combined again with the remaining fraction of the stripping air that has passed upwardly through the tower, picked up the residual sulfur-bearing contaminants from the wash water and emerged from the top of the final stage stripper 14 in line 42. As has already been mentioned, the descending stream of wash water is scrubbed by the ascending air stream in the final stage tower to remove substantially all of dissolved sulfur-bearing constituents; whereupon, the regenerated wash water is returned to the first stage absorption tower for reuse.

The sulfur-laden gases stripped from the wash water in the second stage desorption tower are passed through a pressure regulator 44 in line 32 which further reduces the pressure thereof down to about 6 p.s.i., the same as that of the effluent air stream leaving the top of the third stage tower. Both of these gas streams are at approximately the same temperature, namely 120° F. After passing through regulator 44, the sulfur-laden gas stream from the second stage stripper 30 is split and about one-third thereof is delivered to the intake end of a conventional "Claus" furnace 46 through branch line 48. Immediately upstream of the furnace, the portion of the sulfur-laden gas stream in line 48 is joined by the combined effluent air stream in line 42 from the third stage stripper and the by-passed air in line 40 which are mixed therewith as a source of combustion air and sulphur for the reaction to take place in the furnace. The effluent air stream issuing from the top of the third stage tower is ordinarily discharged to the atmosphere along with its reclaimable sulfur values in accordance with the prior art gas purification systems of this type.

In the "Claus" furnace the reactants which are primarily oxygen and hydrogen sulfide are heated to about 1800° F. whereupon the sulfur values are converted to sulfur dioxide in accordance with the following reaction well known to the art:

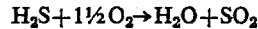
$$H_2S + 1\frac{1}{2}O_2 \rightarrow H_2O + SO_2$$

The sulfur dioxide is drawn off the discharge end of the "Claus" furnace through line 50 where it is combined with the remaining two-thirds portion of the sulfur laden gases issuing from the top of the flash stripper 30 in branch line 52 downstream of regulator 44. These reactants are then fed into the upper end of reactor 54 operated at about 450° F. and three p.s.i. pressure where the sulfur values in both of the reactants are reclaimed as elemental sulfur in accordance with the following reaction:

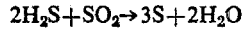
$$2H_2S + SO_2 \rightarrow 3S + 2H_2O$$

Thereafter, the sulfur and water vapor produced in the reactor are drawn off through line 56 and cooled down to about 300° F. in cooler 58 before being fed into scrubbing tower 60.

In the scrubbing tower, the molten sulfur is separated from the vent gases and water vapor which are drawn off the top through line 62 and vented to the atmosphere while the sulfur is taken from the bottom by means of line 64 to sulfur storage where it is cooled until it changes from the liquid to the solid phase. A portion of the molten sulfur product taken from the bottom of the tower is preferably recycled back into the top of the latter by means of pump 68 and return line 70. Recycling the sulfur product brings about a substantially complete removal of sulfur from the vent gases and water vapor in a manner well known to the art.

Having thus described the several useful and novel features of the gas purification system of the present invention it will be apparent that the many worthwhile objectives for which it was developed have been achieved. Although but a single specific embodiment of the system has been illustrated and described in connection with the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The process for removing hydrogen sulfide and other water soluble gaseous contaminants from natural gas and thereafter reclaiming the sulfur values therefrom which comprises the steps of washing the sour natural gas with water at an elevated pressure of 200 p.s.i. and above and at a temperature of approximately 100° F. to absorb the water-soluble gaseous contaminants therefrom, separating the sweetened gas from the contaminant-laden wash water, desorbing the major portion of the dissolved contaminants by flash stripping them from the wash water at a substantially reduced pressure, separating the desorbed contaminants from the partially decontaminated wash water, desorbing the residual portion of dissolved contaminants by air stripping same from the partially decontaminated wash water, separating the regenerated wash water from the effluent air stream containing the residual contaminants, burning the residual contaminants in the effluent air stream and a portion of the previously desorbed contaminants with additional air to convert the sulfides to sulfur dioxide, reacting the sulfur dioxide thus produced with the remaining portion of the previously desorbed contaminants at about 450° F. and at substantially atmospheric pressures to reduce the sulfur-bearing constituents to elemental sulfur, separating the sulfur from the sulfur-free products and by-products of the process, and recovering the sulfur values as elemental sulfur.

2. The process as set forth in claim 1 in which the regenerated wash water from the final desorption stage is recycled to the absorption stage preparatory to treating the sour gas.

3. The process as set forth in claim 1 in which the absorption of the water soluble gaseous contaminants from the sour natural gas stream is carried out at a pressure in excess of 200 p.s.i.

4. The process as set forth in claim 1 in which the wash water is stripped of the major portion of dissolved contaminants by flashing at a pressure only slightly above atmospheric.

5. The process as set forth in claim 1 in which the residual dissolved gaseous contaminants are stripped with air at the ambient temperature and a pressure of approximately 10 p.s.i. higher than that of the wash water.

6. The process as set forth in claim 1 in which approximately one-third of the contaminants desorbed in the flash stripping stage are combined with the effluent air stream from the final stripping stage for use in the production of the sulfur dioxide while the remaining two-thirds of the contaminant gases are employed in the reduction of the sulfur dioxide to elemental sulfur.

7. The process as set forth in claim 1 in which the sulfur dioxide is reduced with hydrogen sulfide to elemental sulfur at a temperature of approximately 750° F.

8. The process as set forth in claim 1 in which the reduction of the sulfur dioxide to elemental sulfur by the hydrogen sulfide is carried out at approximately 750° F. and the sulfur thus produced is cooled to about 250° F.

preparatory to separating the sulfur-free products and by-products of the process therefrom.

References Cited in the file of this patent

UNITED STATES PATENTS

| | | |
|---|---|---|
| 1,678,630 | Bähr | July 31, 1928 |
| 1,936,570 | Bragg | Nov. 28, 1933 |
| 2,003,442 | Hechenbleikner | June 4, 1935 |
| 2,045,747 | Baehr | June 30, 1936 |
| 2,066,896 | Merriam | Jan. 5, 1937 |
| 2,070,620 | Price | Feb. 16, 1937 |
| 2,113,002 | Schreiber | Apr. 5, 1938 |
| 2,477,314 | Scharmann | July 26, 1949 |
| 2,490,799 | Gollmar | Dec. 13, 1949 |
| 2,881,047 | Townsend | Apr. 7, 1959 |